(12) United States Patent
Hebbar et al.

(10) Patent No.: US 12,229,131 B2
(45) Date of Patent: Feb. 18, 2025

(54) INTERACTION EVENT DETAILS USING SEARCH SERVICES

(71) Applicant: Truist Bank, Charlotte, NC (US)

(72) Inventors: Nagaraja Hebbar, Atlanta, GA (US); Sweta Sharan, Atlanta, GA (US); Narayan Kapil, Charlotte, NC (US)

(73) Assignee: Truist Bank, Charlotte, NC (US)

( * ) Notice: Subject to any disclaimer, the term of this patent is extended or adjusted under 35 U.S.C. 154(b) by 123 days.

(21) Appl. No.: 18/074,021

(22) Filed: Dec. 2, 2022

(65) Prior Publication Data

US 2024/0184779 A1 Jun. 6, 2024

(51) Int. Cl.
*G06F 16/242* (2019.01)
*G06F 16/2453* (2019.01)

(52) U.S. Cl.
CPC .... *G06F 16/24539* (2019.01); *G06F 16/2425* (2019.01); *G06F 16/24532* (2019.01)

(58) Field of Classification Search
CPC ...................................................... G06F 16/24
See application file for complete search history.

(56) References Cited

U.S. PATENT DOCUMENTS

| 10,572,531 B1* | 2/2020 | Tiwari | G06F 16/435 |
| 2019/0213230 A1* | 7/2019 | Lu | G06F 12/123 |
| 2021/0019382 A1* | 1/2021 | Huang | G06F 21/31 |

* cited by examiner

*Primary Examiner* — Maher N Algibhah
(74) *Attorney, Agent, or Firm* — Kilpatrick Townsend & Stockton LLP; Michael A. Springs, Esq.

(57) ABSTRACT

A search query can be resolved efficiently using stored key information in a data cache. A system can receive a search query via an application programming interface (API). The search query can comprise a set of query parameters. The system can select at least one interaction event search service. The system can identify a plurality of interaction events relevant to the search query. Each interaction event can include a description and key information used to locate each interaction event. The system can retrieve the key information for each interaction event. The system can store, in a data cache, the key information for each interaction event. Subsequent to retrieving the key information, the system can retrieve, using at least a portion of the key information, descriptions of a first portion of interaction events. Additionally, the system can transmit the descriptions of the first portion of interaction events to the user.

17 Claims, 4 Drawing Sheets

INTERACTION EVENT DETAILS USING SEARCH SERVICES

TECHNICAL FIELD

The present disclosure relates generally to searches of interaction events and, more particularly (although not necessarily exclusively), to selecting a plurality of search services to search databases.

BACKGROUND

Server operators can process millions of interaction events daily for a variety of users. A server operator can receive a request from a user for information associated with a portion of the interaction events. A source of the request can originate from a variety of locations and the request can occur at any time during a day. Retrieving and transmitting the portion of the interaction events to the user can be time consuming and require a large amount of computing power and storage space.

SUMMARY

Search results can be transmitted to a user in a manner that conserves data capacity of a data cache. For example, a method described herein can include receiving a search query from a user via an application programming interface (API). The search query can include a set of query parameters. The method can further include selecting at least one interaction event service based on the set of query parameters. Each interaction event service can be associated with at least one database. Additionally, the method can include identifying a plurality of interaction events relevant to the search query within the at least one interaction event search service. Each interaction event can include a description and key information. The key information can be used to locate each interaction event within the at least one database. The method can include retrieving the key information for each interaction event of the plurality of interaction events. The method can further include storing, in a data cache, the key information for each interaction event of the plurality of interaction events. Subsequent to retrieving the key information, the method can include, retrieving, using at least a portion of the key information, descriptions of a first portion of the plurality of interaction events. Additionally, the method can include transmitting the descriptions of the first portion of the plurality of interaction events to the user.

In another example, a system described herein can include a processor and a memory that includes instructions executable by the processor to perform operations. The operations can include receiving a search query from a user via an API. The search query can include a set of query parameters. The operations can further include selecting at least one interaction event service based on the set of query parameters. Each interaction event service can be associated with at least one database. Additionally, the operations can include identifying a plurality of interaction events relevant to the search query within the at least one interaction event search service. Each interaction event can include a description and key information. The key information can be used to locate each interaction event within the at least one database. The operations can include retrieving the key information for each interaction event of the plurality of interaction events. The operations can further include storing, in a data cache, the key information for each interaction event of the plurality of interaction events. Subsequent to retrieving the key information, the operations can include retrieving, using at least a portion of the key information, descriptions of a first portion of the plurality of interaction events. Additionally, the operations can include transmitting the descriptions of the first portion of the plurality of interaction events to the user.

In an example, a non-transitory computer-readable medium includes instructions that are executable by a processor for causing the processor to perform operations. The operations can include receiving a search query from a user via an API. The search query can include a set of query parameters. The operations can further include selecting at least one interaction event service based on the set of query parameters. Each interaction event service can be associated with at least one database. Additionally, the operations can include identifying a plurality of interaction events relevant to the search query within the at least one interaction event search service. Each interaction event can include a description and key information. The key information can be used to locate each interaction event within the at least one database. The operations can include retrieving the key information for each interaction event of the plurality of interaction events. The operations can further include storing, in a data cache, the key information for each interaction event of the plurality of interaction events. Subsequent to retrieving the key information, the operations can include retrieving, using at least a portion of the key information, descriptions of a first portion of the plurality of interaction events. Additionally, the operations can include transmitting the descriptions of the first portion of the plurality of interaction events to the user.

DETAILED DESCRIPTION

Certain aspects and examples of the present disclosure relate to a system for receiving an interaction event search query from a user, selecting at least one interaction event search service to perform a search of databases, retrieve information for a portion of a plurality of interaction events, and transmit the information to the user. Databases can store various categories of interaction events. In some examples, the API can select multiple event search services to perform the search. The multiple event search services can perform the search of the databases in parallel.

Retrieving the information for the portion of interaction events can involve first retrieving key information for each interaction event in the portion of interaction events. The key information can include data that can be used to locate the interaction event associated with the key information within the at least one database. The key information can be stored in a data cache. Subsequent to storing the key information, descriptions for the portion of the plurality of interaction events can be retrieved using the key information and transmitted to the user. Data associated with the key information can take up less storage space than data associated with the descriptions. By using the key information, the search query request can be fulfilled in a reduced amount of time while using less computing power and storage space.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

Figure 1:
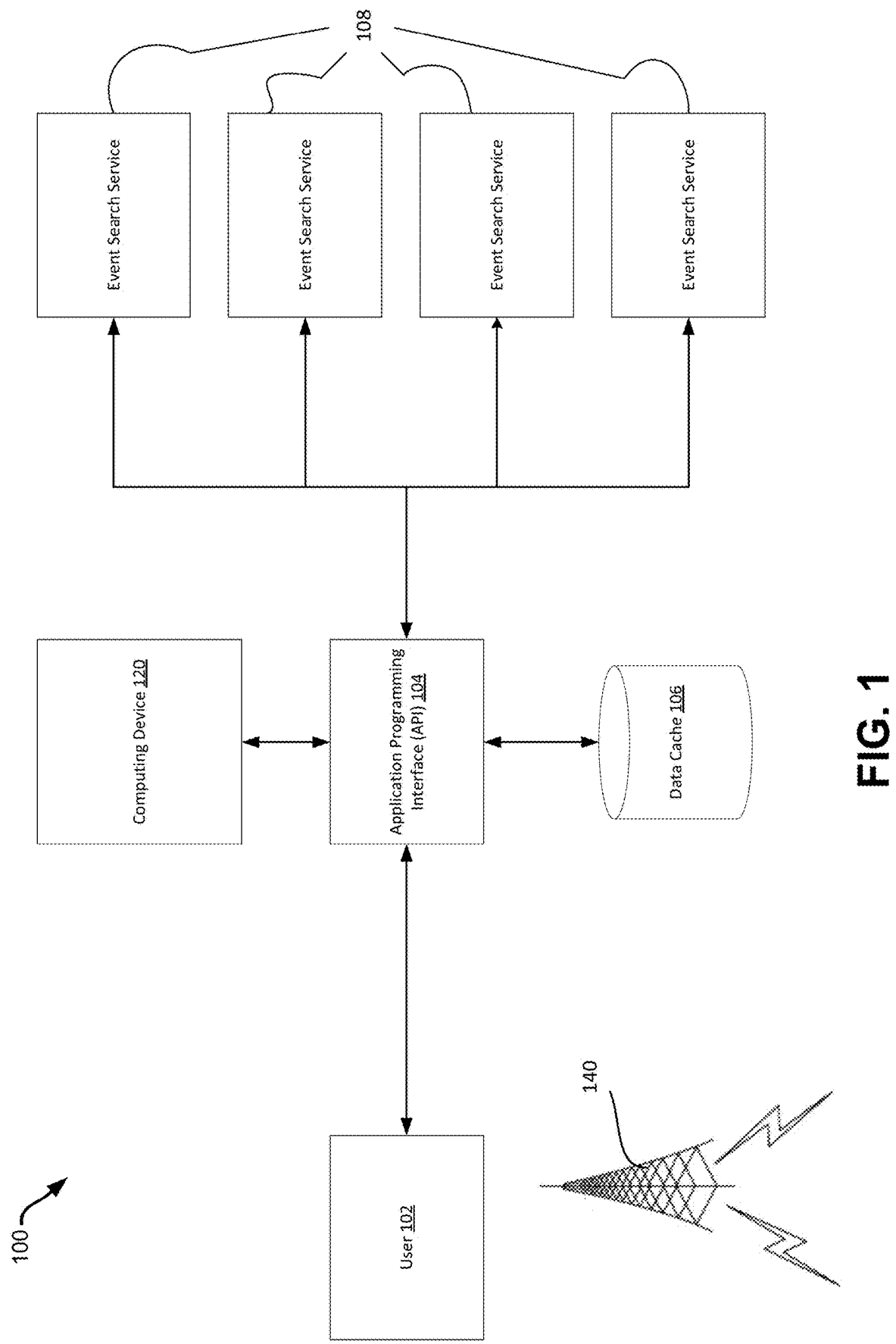
FIG. 1 is a schematic of an interactive event search environment according to one example of the present disclosure.

FIG. 1 is a schematic of an interactive event search environment 100 according to one example of the present disclosure. The interactive event search environment 100 can include a plurality of interaction event search services 108, an Application Programming Interface (API) 104, a computing device 120, a data cache 106, one or more communication networks 140, and a user 102. Each interactive event search service of the plurality of interactive event search services 108 can be associated with at least one database. Although the API 104, the data cache 106, and the computing device 120 are illustrated separately in the interactive event search environment 100, in certain examples, the API 104 and the data cache 106 can be included within the computing device 120 and in other examples, the computing device 120 can be situated in a remote location away from the interactive event search environment 100.

The user 102 and each interaction event search service can send or receive communication with the API 104 or the computing device 120 over the one or more communication networks 140. The one or more communication networks 140 may correspond to one or more Wide Area Networks ("WANs"), such as the Internet, through which the user 102, each interaction event search service of the plurality of interaction event search services 108, the computing device 120, and the API 104 may communicate with servers via web browsers or client-side applications, to establish communication sessions, request and receive web-based resources, and access other features of applications or services.

The API 104 can receive a search query from the user 102. The API can select at least one interaction event search service based on a set of query parameters. The at least one interaction event search service can identify a plurality of interaction events relevant to the search query within the at least one database associated with the at least one interaction event search service. Each interaction event of the plurality of interaction events can include a description and key information. The key information includes data that can be used to locate the interaction event associated with the key information within the at least one database. For example, the key information can include a batch ID and a name of a database where the description for the interaction event associated with the key information is stored. For each interaction event, the key information of the interaction event can use less storage space than storage space of the description of the interaction event.

The API 104 can retrieve key information for the plurality of interaction events. Additionally, the API 104 can store the key information in the data cache 106. Subsequent to retrieving the key information, the API 104 can retrieve, using at least a portion of the key information, descriptions of a first portion of the plurality of interaction events. The API 104 can transmit the descriptions of the first portion to the user 102.

Figure 2:
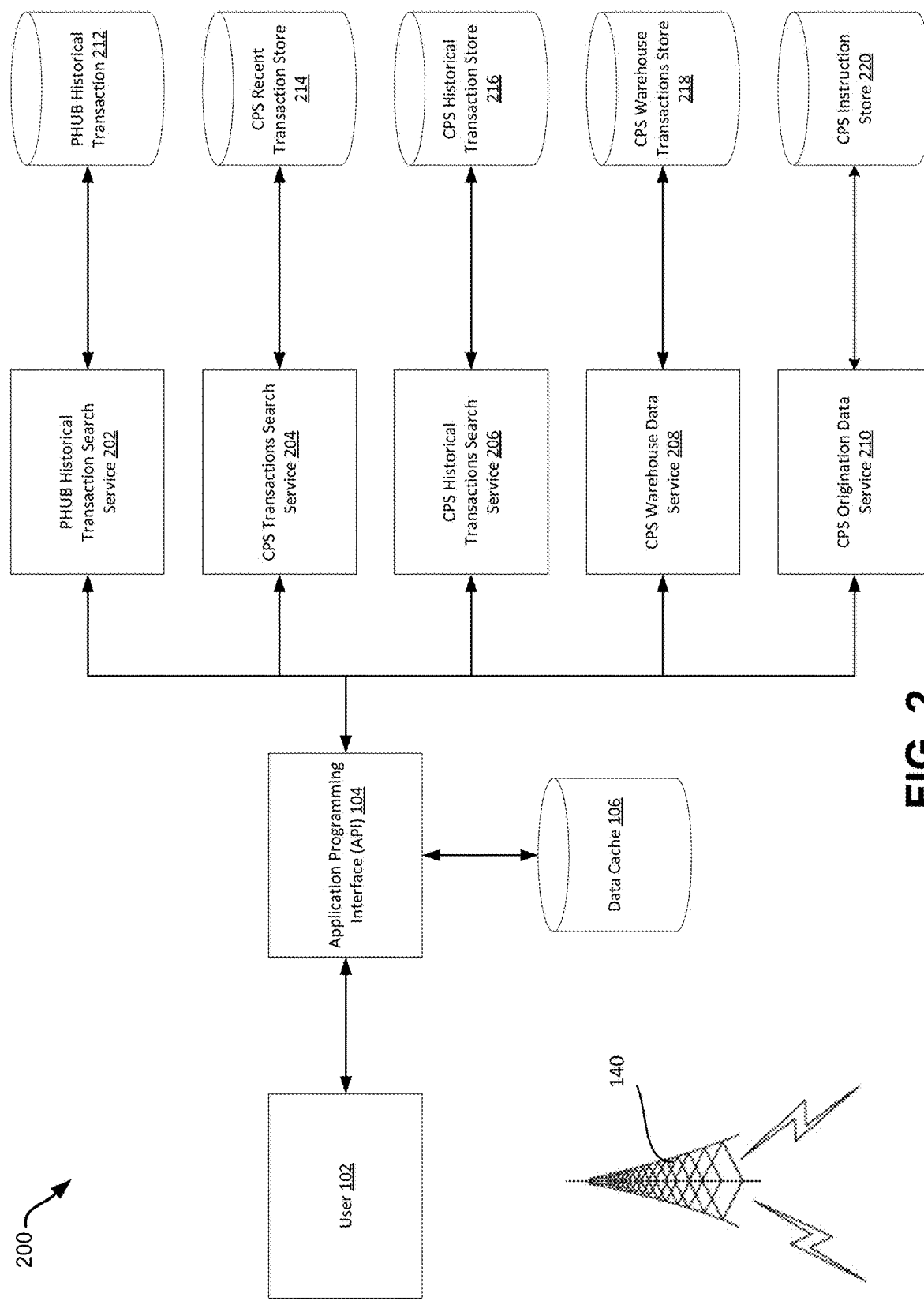
FIG. 2 is a schematic of an additional interactive event search environment according to one example of the present disclosure.

FIG. 2 is a schematic of an additional interactive event search environment 200 according to one example of the present disclosure. The interactive event search environment 200 can include a user 102, an API 104, a data cache 106, one or more communication networks 140, a set of interactive event search services, and a set of databases. In FIG. 2, five interactive event search services are shown. In other examples, a number of interactive event search services can be more than five or less than five. The set of interactive event search services can include a payment hub (PHUB) historical transaction search service 202, a customer payment service (CPS) transaction search service 204, a CPS historical transactions search service 206, a CPS warehouse data service 208, and a CPS origination data service 210. In some examples, an interactive event can be a transaction.

Each interaction event search service can be associated with and can search one of the databases from the set of databases. The PHUB historical transaction search service 202 is associated with a PHUB historical transaction database 212. The CPS transaction search service 204 is associated with a CPS recent transaction store 214. The CPS historical transaction search service 206 is associated with a CPS historical transaction store 216. The CPS warehouse data service 208 is associated with a CPS warehouse transactions store 218. The CPS origination data service 210 is associated with a CPS instruction store 220.

The PHUB historical transaction database 212 can store completed transactions stored prior to a most recent database system update. The CPS recent transaction store 214 can store transactions completed within a hundred days prior to the current date. The CPS historical transaction store can store transactions completed at least one hundred days before the current date but not stored in the PHUB historical transaction database 212. The CPS warehouse transactions store 218 can store information associated with recurring transactions. The CPS instruction store 220 can store information associated with unique interaction events, such as interaction events processed by a third party.

The user 102 and each interaction event search service of the set of interaction event services (e.g., 202-210) can send or receive communication with the API 104 over the one or more communication networks 140. The one or more communication networks 140 may correspond to one or more Wide Area Networks ("WANs"), such as the Internet, through which the user 102, each interaction event search service, and the API 104 may communicate with servers via web browsers or client-side applications, to establish communication sessions, request and receive web-based resources, and access other features of applications or services.

The API 104 can receive a search query from the user 102. The API can select at least one interaction event search service based on a set of query parameters. The set of query parameters can include a pagination limit that places a limit on a number of interaction events initially transmitted to the user 102. The at least one interaction event search service can identify a plurality of interaction events relevant to the search query within the at least one database associated with the at least one interaction event search service. For example, the set of query parameters can include a range of calendar dates for the search. The API 104 can select interaction event search services associated with databases that include interaction events that were processed during the range of calendar dates for the search. The set of query parameters can include a type of interaction event, for example, the type of interaction event could be processed mortgage payments. The API 104 can select only the interaction event search services associated with databases that store interaction events that include mortgage payments.

Each interaction event of the plurality of interaction events can include a description and key information. The key information includes data that can be used to locate the interaction event associated with the key information within the at least one database. For example, the key information can include a batch ID and a name of a database where the description for the interaction event associated with the key information is stored. For each interaction event, the key information of the interaction event can use less storage space than storage space used by the description of the interaction event.

The API 104 can retrieve key information for the plurality of interaction events. Additionally, the API 104 can store the key information in the data cache 106. Subsequent to retrieving the key information, the API 104 can retrieve, using at least a portion of the key information, descriptions of a first portion of the plurality of interaction events. An amount of interaction events in the first portion can be equivalent to the pagination limit. The API 104 can transmit the descriptions of the first portion to the user 102. The user 102 can send a request for additional results to the API 104. The API 104 can access the additional results from at least one of the databases by using the key information stored in the data cache 106. The stored key information can allow the API 104 to access additional interaction events stored in the databases without having to store the additional interaction events in the data cache 106.

Figure 3:
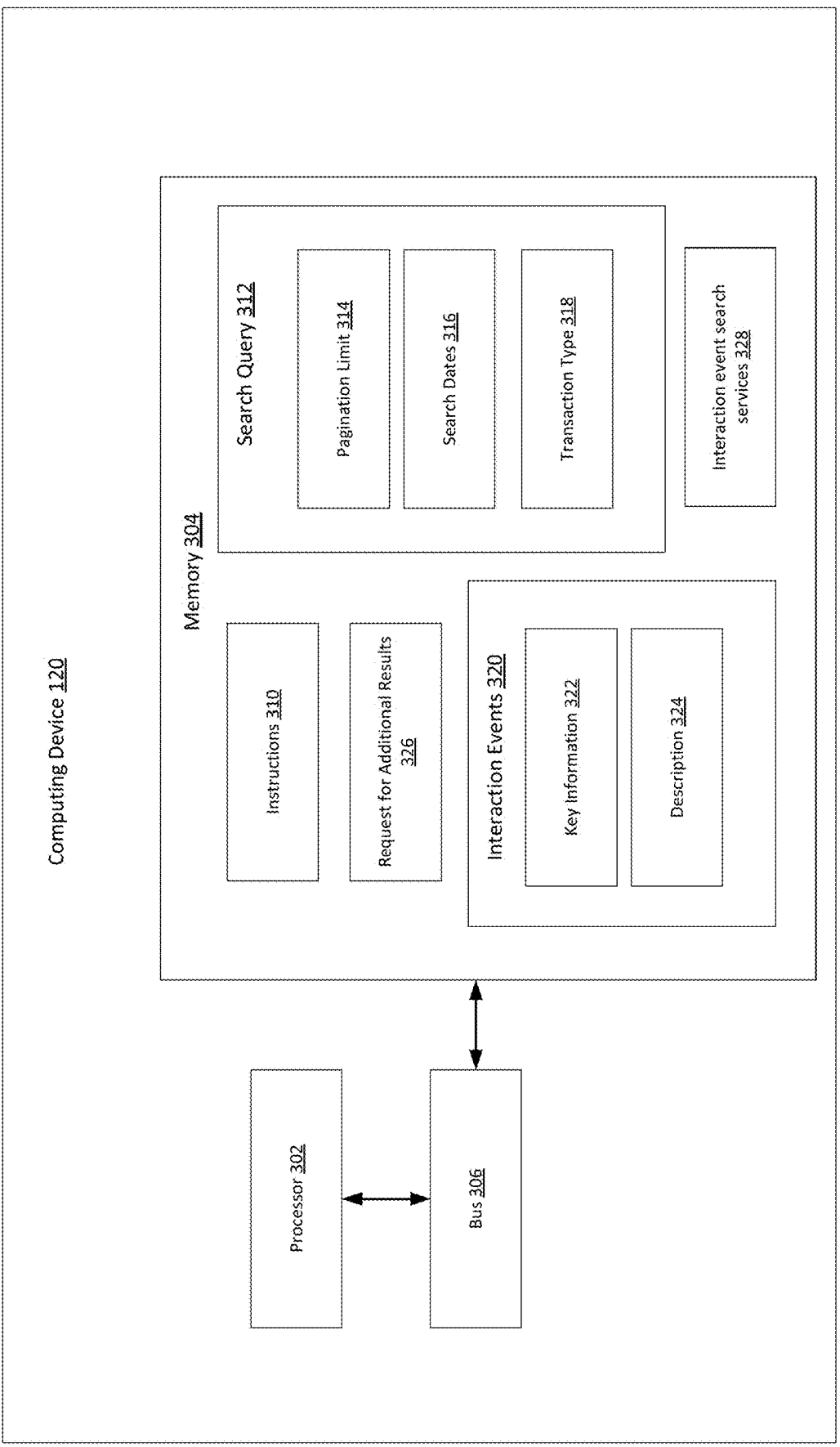
FIG. 3 is a block diagram of a computing device for providing interactive event searches according to one example of the present disclosure.

FIG. 3 is a block diagram of a computing device 130 for providing interactive event searches according to one example of the present disclosure. The components shown in FIG. 3, such as a processor 302, a memory 304, a bus 306, and the like, may be integrated into a single structure such as within the single housing of the computing device 130. Alternatively, the components shown in FIG. 3 can be distributed from one another and in electrical communication with each other.

As shown, the computing device 130 includes the processor 302 communicatively coupled to the memory 304 by the bus 306. The processor 302 can include one processor or multiple processors. Non-limiting examples of the processor 302 include a Field-Programmable Gate Array (FPGA), an application specific integrated circuit (ASIC), a microprocessor, or any combination of these. The processor 302 can execute instructions 310 stored in the memory 304 to perform operations. In some examples, the instructions 310 can include processor-specific instructions generated by a compiler or an interpreter from code written in any suitable computer-programming language, such as C, C++, C #, or Java.

The memory 304 can include one memory device or multiple memory devices. The memory 304 can be non-volatile and may include any type of memory device that retains stored information when powered off. Non-limiting examples of the memory 304 include electrically erasable and programmable read-only memory (EEPROM), flash memory, or any other type of non-volatile memory. At least some of the memory 304 can include a non-transitory computer-readable medium from which the processor 302 can read instructions 310. The non-transitory computer-readable medium can include electronic, optical, magnetic, or other storage devices capable of providing the processor 302 with the instructions 310 or other program code. Non-limiting examples of the non-transitory computer-readable medium include magnetic disk(s), memory chip(s), RAM, an ASIC, or any other medium from which a computer processor can read instructions 310.

The memory 304 can further include a search query 312 from a user 102, interaction events 320, interaction event search services 328, and a request for additional results 326. The search query 312 can include a set of query parameters. The query parameters can include a pagination limit 314, search dates 316, and transaction type 318. Each interaction event can include key information 322 and a description 324. The processor 302 can select at least one of the interaction event search services 328 based on the set of query parameters of the search query 312.

The processor 302 can identify a plurality of interaction events 320 relevant to the search query 312. Additionally, the processor 302 can transmit descriptions of a first portion of the plurality of interaction events 320. The first portion of the plurality of interaction events 320 can be retrieved from the at least one of the interaction event search services 328 using at least a portion of the key information 322. An amount of interaction events 320 in the first portion can be equivalent to the pagination limit 314. In some examples, the processor 302 can transmit descriptions of a second portion of the plurality of interaction events 320 to the user 102 after receiving the request for additional results 326.

Figure 4:
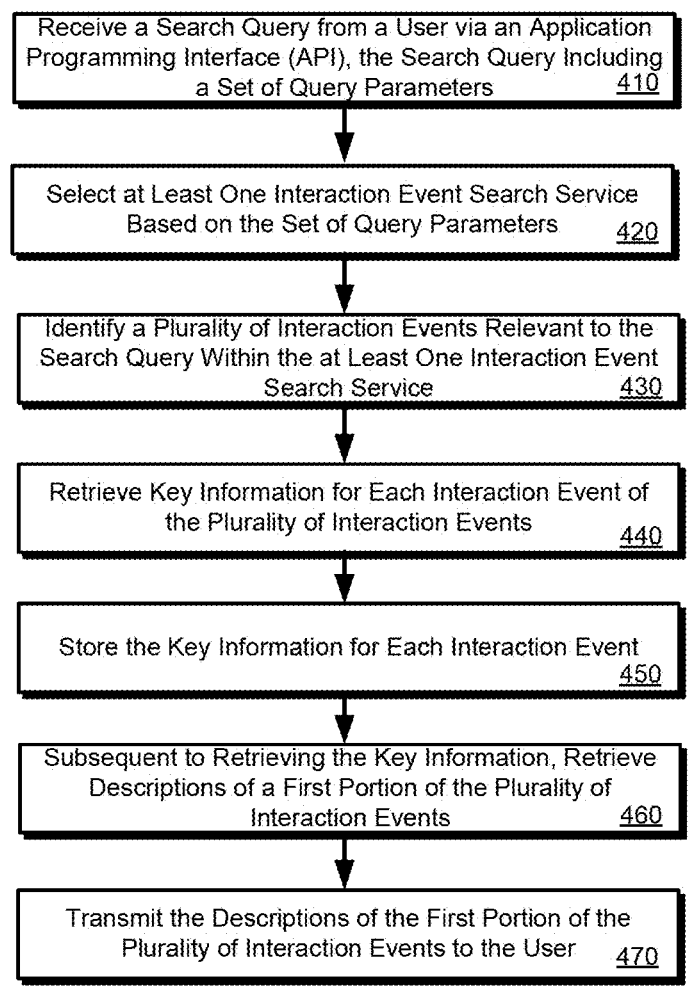
FIG. 4 is a flow chart of a process for providing interactive event searches according to one example of the present disclosure.

In some examples, the computing device 130 can implement the process shown in FIG. 4 for effectuating some aspects of the present disclosure. Other examples can involve more operations, fewer operations, different operations, or a different order of the operations shown in FIG. 4.

FIG. 4 is a flow chart of a method 400 for providing interactive event searches according to one example of the present disclosure. Operations of methods may be performed by software, firmware, hardware, or a combination thereof. The operations of the method 400 start at block 410.

At block 410, the method 400 involves receiving a search query 312 from a user 102 via an API 104, the search query 312 including a set of query parameters. The query parameters can include a pagination limit 314, search dates 316, and transaction type 318. The pagination limit 314 can indicate a limit to a number of results of the search query 312 that are originally transmitted to the user 102.

At block 420, the method 400 involves selecting at least one interaction event search service based on the set of query parameters. Each interaction event search service of the at least one interaction event search service can be associated with at least one database. Examples of interaction event search services 328 include historical interaction event search services, recent interaction event search services, data warehouse search services, or origination data search services. Recent interaction events can include any interaction event completed within a year of a current date. Historical interaction events can include any interaction event that commenced over a year from the current date. In some examples, multiple interaction event search services can be selected based on the set of query parameters.

At block 430, the method 400 involves identifying a plurality of interaction events relevant to the search query within the at least one interaction event search service. Each interaction event of the plurality of interaction events can include a description 324 and key information 322 used to locate each interaction event within the at least one database. In some examples, the plurality of interaction events can be identified within a plurality of interaction event search services 328. Identifying the plurality of interaction events within at least two interaction event search services can be performed in parallel.

At block 440, the method 400 involves retrieving key information 322 for each interaction event of the plurality of interaction events. The key information 322 can include information about the location of an interaction event associated with the key information 322. For example, the key information 322 can include a batch ID and a name of a database where the description 324 for the interaction event associated with the key information 322 is stored.

At block 450, the method 400 involves storing the key information 322 for each interaction event in the plurality of interaction events. The key information 322 can be stored in a data cache 106. An amount of data storage space in the data cache 106 used to store the key information 322 associated with an interaction event can be considerably less than an amount of space that would be used to store the description 324 associated with the interaction event. The key information 322 data stored in the data cache 106 can be expunged from the data cache after a period of time after a search query is ended. For example, key information 322 can be expunged 24 hours after a search query has ended.

At block 460, the method 400 involves retrieving, using the key information 322, descriptions of a first portion of the plurality of interaction events. The descriptions of the first portion can be retrieved subsequent to retrieving and storing the key information 322. In some examples, a number of interaction events included in the first portion of the plurality of interaction events is less than or equal to the pagination limit 314. In some examples, the method can involve applying at least one process to the descriptions of the first portion of the plurality of interaction events. The at least one process can include authenticating, transforming, or integrating data associated with the descriptions of the first portion.

At block 470, the method 400 involves transmitting the descriptions of the first portion of the plurality of interaction events to the user 102. The descriptions of the first portion can be displayed on a single webpage. In some examples, the method 400 involves receiving, from the user 102, a request for additional results 326. The method can also involve accessing, from the data cache, the key information associated with a second portion of the plurality of interaction events. Descriptions of the second portion of the plurality of interaction events can be retrieved from the at least one database using the key information associated with the second portion. The descriptions of the second portion of the plurality of interaction events can be transmitted to the user.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A computer-implemented method comprising:
   receiving a search query from a user via an application programming interface (API), the search query comprising a set of query parameters;
   selecting a plurality of interaction event search services based on the set of query parameters, each interaction event search service of the plurality of interaction event search services associated with a different database of a plurality of databases;
   identifying, in parallel by at least two interaction event search services of the plurality of interaction event search services, a plurality of interaction events relevant to the search query within the plurality of interaction event search services, each interaction event of the plurality of interaction events comprising a description and key information used to locate each interaction event within the plurality of databases, the key information comprising a network location identifier;
   retrieving the key information for each interaction event of the plurality of interaction events;
   storing, temporarily in a data cache for a predetermined amount of time, the key information for each interaction event of the plurality of interaction events, wherein the key information is deleted from the data cache after the predetermined amount of time elapses;
   subsequent to retrieving the key information, retrieving, using at least a portion of the key information, descriptions of a first portion of the plurality of interaction events; and
   transmitting the descriptions of the first portion of the plurality of interaction events to the user.

2. The computer-implemented method of claim 1, wherein the set of query parameters comprises a pagination limit, and wherein a number of events of the first portion of the plurality of interaction events is equivalent to the pagination limit.

3. The computer-implemented method of claim 2, further comprising:
   receiving, from the user, a request for additional results;
   accessing, from the data cache, the key information associated with a second portion of the plurality of interaction events;
   retrieving, using the key information associated with the second portion, descriptions of the second portion of the plurality of interaction events from the plurality of databases; and
   transmitting the descriptions of the second portion of the plurality of interaction events to the user.

4. The computer-implemented method of claim 1, further comprising applying at least one process to the descriptions of the first portion.

5. The computer-implemented method of claim 4, wherein the at least one process comprises authenticating, transforming, or integrating data associated with the descriptions of the first portion.

6. The computer-implemented method of claim 1, wherein the plurality of interaction event search services comprises a historical interaction event search service, recent interaction event search service, data warehouse search service, or an origination data search service.

7. A system comprising:
   a computing device comprising:
      a processor; and
      a memory that includes instructions executable by the processor for causing the processor to perform operations comprising:
         receiving a search query from a user via an application programming interface (API), the search query comprising a set of query parameters;
         selecting a plurality of interaction event search services based on the set of query parameters, each interaction event search service of the plurality of interaction event search services associated with a different database of a plurality of databases;
         identifying, in parallel by at least two interaction event search services of the plurality of interaction event search services, a plurality of interaction events relevant to the search query within the plurality of interaction event search services, each interaction event of the plurality of interaction events comprising a description and key information used to locate each interaction event within the plurality of databases, the key information comprising a network location identifier;

retrieving the key information for each interaction event of the plurality of interaction events;

storing, temporarily in a data cache for a predetermined amount of time, the key information for each interaction event of the plurality of interaction events, wherein the operation of storing the key information comprises deleting the key information from the data cache after the predetermined amount of time elapses;

subsequent to retrieving the key information, retrieving, using at least a portion of the key information, descriptions of a first portion of the plurality of interaction events; and transmitting the descriptions of the first portion of the plurality of interaction events to the user.

8. The system of claim 7, wherein the set of query parameters comprises a pagination limit and wherein a number of events of the first portion of the plurality of interaction events is equivalent to the pagination limit.

9. The system of claim 8, wherein the operations further comprise:

receiving, from the user, a request for additional results;

accessing, from the data cache, the key information associated with a second portion of the plurality of interaction events;

retrieving, using the key information associated with the second portion, descriptions of the second portion of the plurality of interaction events from the plurality of databases; and transmitting the descriptions of the second portion of the plurality of interaction events to the user.

10. The system of claim 7, wherein the operations further comprise applying at least one process to the descriptions of the first portion.

11. The system of claim 10, wherein the at least one process comprises authenticating, transforming, or integrating data associated with the descriptions of the first portion.

12. The system of claim 7, wherein the plurality of interaction event search services comprises a historical interaction event search service, recent interaction event search service, data warehouse search service, or an origination data search service.

13. A non-transitory computer-readable medium comprising instructions that are executable by a processor for causing the processor to perform operations comprising:

receiving a search query from a user via an application programming interface (API), the search query comprising a set of query parameters;

selecting a plurality of interaction event search services based on the set of query parameters, each interaction event search service of the plurality of interaction event search services associated with a different database of a plurality of databases;

identifying, in parallel by at least two interaction event search services of the plurality of interaction event search services, a plurality of interaction events relevant to the search query within the plurality of interaction event search services, each interaction event of the plurality of interaction events comprising a description and key information used to locate each interaction event within the plurality of databases, the key information comprising a network location identifier;

retrieving the key information for each interaction event of the plurality of interaction events;

storing, temporarily in a data cache for a predetermined amount of time, the key information for each interaction event of the plurality of interaction events, wherein the operation of storing the key information comprises deleting the key information from the data cache after the predetermined amount of time elapses;

subsequent to retrieving the key information, retrieving, using at least a portion of the key information, descriptions of a first portion of the plurality of interaction events; and transmitting the descriptions of the first portion of the plurality of interaction events to the user.

14. The non-transitory computer-readable medium of claim 13, wherein the set of query parameters comprises a pagination limit and wherein a number of events of the first portion of the plurality of interaction events is equivalent to the pagination limit.

15. The non-transitory computer-readable medium of claim 14, wherein the operations further comprise:

receiving, from the user, a request for additional results;

accessing, from the data cache, the key information associated with a second portion of the plurality of interaction events;

retrieving, using the key information associated with the second portion, descriptions of the second portion of the plurality of interaction events from the plurality of databases; and transmitting the descriptions of the second portion of the plurality of interaction events to the user.

16. The non-transitory computer-readable medium of claim 13, wherein the operations further comprise applying at least one process to the descriptions of the first portion.

17. The non-transitory computer-readable medium of claim 16, wherein the at least one process comprises authenticating, transforming, or integrating data associated with the descriptions of the first portion.

* * * * *